Dec. 23, 1969  H. NERWIN  3,485,157
CODED ROLL FILM MAGAZINE AND CODE RESPONSIVE CAMERA MECHANISMS
Filed June 29, 1967  3 Sheets-Sheet 1

HUBERT NERWIN
INVENTOR.

BY Malcolm S. Dunn
Robert W. Hampton

ATTORNEYS

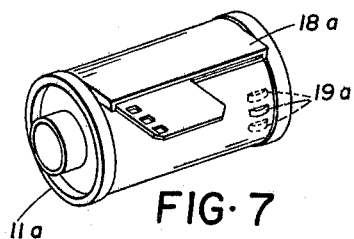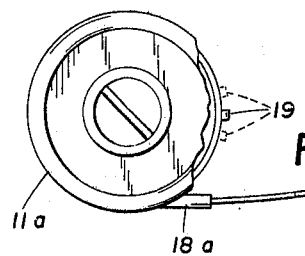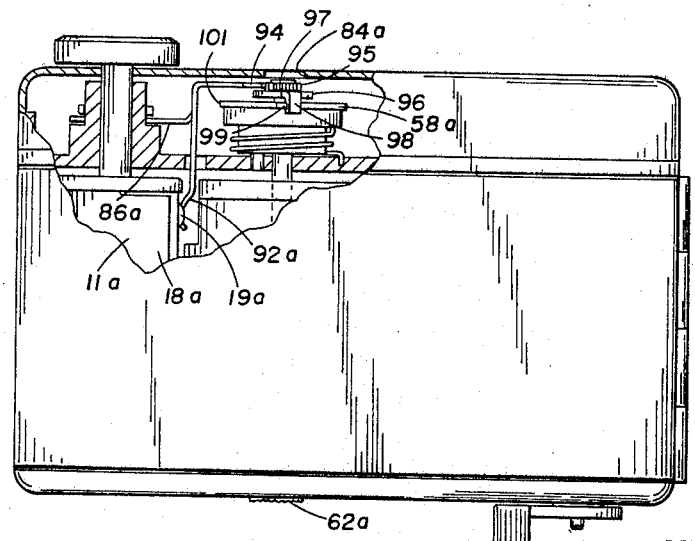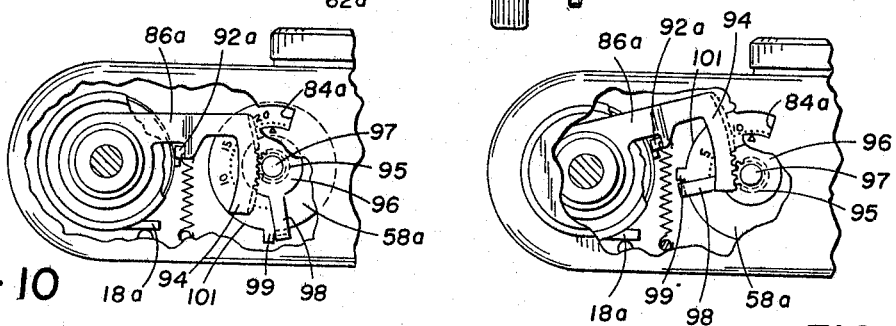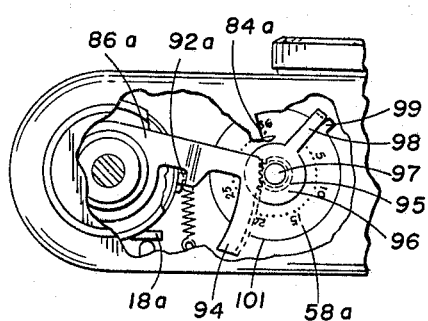

Dec. 23, 1969  H. NERWIN  3,485,157
CODED ROLL FILM MAGAZINE AND CODE RESPONSIVE CAMERA MECHANISMS
Filed June 29, 1967  3 Sheets-Sheet 3

HUBERT NERWIN
INVENTOR.

BY

ATTORNEYS

United States Patent Office 3,485,157
Patented Dec. 23, 1969

3,485,157
CODED ROLL FILM MAGAZINE AND CODE RESPONSIVE CAMERA MECHANISMS
Hubert Nerwin, Rochester, N.Y., assignor to Eastman Kodak Company, Rochester, N.Y., a corporation of New Jersey
Filed June 29, 1967, Ser. No. 649,980
Int. Cl. G03b 19/04
U.S. Cl. 95—31         16 Claims

ABSTRACT OF THE DISCLOSURE

A film container is provided with coding means indicative of the length of a film strip therein. A camera adapted to receive the coded film container includes a mechanism responsive to such coding means for adjusting a film strip length monitoring element of the camera automatically in accordance therewith.

CROSS-REFERENCES TO RELATED APPLICATIONS

Reference is made to commonly assigned copending United States patent application Ser. No. 648,584, entilted "Automatic Film Advancing and Rewinding System," filed in my name on June 26, 1967; United States patent application Ser. No. 612,201, now Patent No. 3,399,843 entitled "Film Advancing and Rewinding Mechanism," filed in my name on Jan. 27, 1967; and United States patent application Ser. No. 654,153, now Patent No. 3,423,041 entitled "Film Winding and Rewinding Device," filed in the names of Kurt Steisslinger and Horst Simon on July 18, 1967.

BACKGROUND OF THE INVENTION

*Field of the invention*

The present invention relates to film containers provided with coding means representative of the length of the film strip associated therewith, and to cameras including mechanisms adjustable automatically in accordance with such coding means when such a coded film container is installed therein.

*Description of the prior art*

As relatively sophisticated cameras have become increasingly popular with amateur photographers, a great deal of effort has been devoted to simplifying the operation of such cameras and to making them more "foolproof," by eliminating manual adjustments and mental calculations. For example, it is now well known to provide a film magazine or film cartridge with coding means indicative of the sensitivity of the film therein and to utilize such coding means to adjust automatically the exposure control system of a camera adapted to receive the coded magazine or cartridge. However, one of the most potentially exasperating aspects associated with many magazine-loaded cameras apparently has been ignored insofar as such efforts have been concerned, namely the means by which the photographer is apprised of the number of exposures remaining to be taken on the particular film in the camera. By way of example, in the United States 35 mm. roll film conventionally is sold in magazines, cartridges or cassettes which provide either 20 or 36 exposures, whereby the photographer is required either to adjust the camera's exposure counter mechanism manually, if it is of the type which indicates the number of exposures remaining to be taken, or to remember the number of exposures provided by the cassette in the camera and subtract accordingly, if the counter merely indicates the number of exposures that have been made. If the photographer fails to adjust the counter or to remember the total number of exposures available and subtract correctly those that have been taken, depending on the type of counter device, he may suddently find that he has run out of film and is unable to photograph a fleeting scene.

SUMMARY OF THE INVENTION

The present invention ensures that the exposure counter mechanism indicates correctly the number of available exposures remaining to be taken, without recourse to any manual adjustments or mental calculations, by adjusting the counter mechanism in response to coding means on the film container indicative of the number of exposures provided by the film strip therein, as determined by its length. In one embodiment of the invention representative of a typical 35 mm. film magazine, the magazine is provided with a coding projection at a predetermined position only if it contains a 20-exposure film strip. When such a magazine is loaded into a camera provided with corresponding code sensing means, the presence of such a projection causes the exposure counter device to be adjusted to indicate the number of exposures remaining along the 20-exposure film strip, whereas the absence of such a projection allows the counter to function on the basis of 36 available exposures. While such a system compensates for the different lengths of film conventionally supplied in 35 mm. magazines or cassettes, a more sophisticated version of the invention, illustrated as an alternate embodiment, can provide for automatic adjustment of the counter mechanism over a wide range of different film lengths in response to corresponding coding means on the film magazine.

In commonly assigned copending U.S. patent application Ser. No. 648,584, entitled "Automatic Film Advancing and Rewinding System," filed in my name on June 26, 1967, I have disclosed and claimed, inter alia, a film winding mechanism which is disabled automatically when all of the available exposure areas have been moved into exposure position. To function properly, such a mechanism likewise must be adjusted in accordance with the length of the film strip being used. Therefore, another embodiment of the present invention contemplates associating this type of mechanism with the previously described magazine coding system so that either the exposure counter device or the film winding disabling mechanism or both are adjusted automatically when a magazine is loaded into the camera.

BRIEF DESCRIPTION OF THE DRAWINGS

Various means for accomplishing the invention will be apparent from the following detailed description of the above-mentioned embodiments, reference being made to the accompanying drawings in which like reference numerals denote like elements and in which:

FIG. 7 is a perspective view of a film magazine similar to that shown in FIG. 1, illustrating means for coding the magazine in accordance with film strips of several different lengths;

FIG. 8 is an enlarged top plan view of the film magazine shown in FIG. 7 with a portion of the cap member broken away to show the coding means on the body portion of the magazine;

FIG. 9 is a rear elevational view of a camera adapted to accommodate a film magazine coded as shown in FIG. 8, with portions of the camera shown broken away to illustrate internal components thereof;

FIG. 10 is a partial top plan view of the camera shown in FIG. 9 with the rewinding knob removed and with portions of the camera and magazine omitted or shown broken away to illustrate the counter adjusting mechanism when a 20-exposure magazine is loaded into the camera;

FIG. 11 corresponds to FIG. 10 and showns the positions of the depicted components when a 10-exposure magazine is loaded into the camera;

FIG. 12 corresponds to FIGS. 10 and 11 and shows the positions of the depicted components when a 36-exposure magazine is loaded into the camera;

DESCRIPTION OF THE PREFERRED EMBODIMENTS

Figure 1:
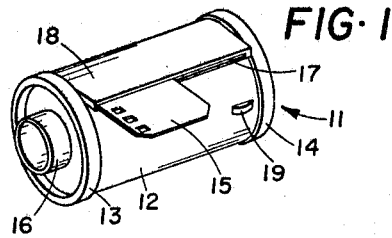
FIG. 1 is a perspective view of a film magazine provided with coding means according to one embodiment of the invention.

Referring first to FIG. 1, the illustrated film magazine 11, per se, is representative of conventional film magazines, typically 35 mm. magazines or cassettes, and comprises a casing 12 closed at its opposite ends by caps 13 and 14. A film strip 15 is wound onto a core member 16 within the magazine and is withdrawn therefrom through a light-tight slot 17 in the tangential lip portion 18 of the casing. If the magazine is loaded with a film strip of appropriate length to provide 20 conventional exposures, a coding projection 19 is located on the casing adjacent cap 14 in predetermined angular relation to lip 18, whereas the coding projection is omitted if the magazine is loaded with film of 36-exposure length. Typically, the coding projection is formed by embossing the flat metal stock from which the casing is fabricated, but the projection obviously could be formed by other means, e.g., by molding it integrally with a molded plastic magazine casing.

The camera shown in FIGS. 2 through 6 is adapted to receive a magazine coded as described above and to translate the magazine coding means into an appropriate automatic adjustment of the camera's exposure counter mechanism. The camera comprises a generally boxlike housing 21 including a rearwardly extending film guide member 22 defining a flat film support surface 23 adapted to support an area of film strip 15 at the focal plane of objective lens 24. When the camera is loaded, the film magazine is positioned in a chamber 25, only slightly wider than the magazine, with core member 16 supported at its lower and upper ends, respectively, by a bearing slot 26, in intermediate wall member 27, and by rewinding spindle 28, which is supported by bushing 29 of top wall member 31 for rotation by external knob 32.

At the side of housing 21 opposite the magazine chamber, a tubular film take-up core 33 is supported rotatably between wall members 27 and 31 and is provided with conventional means, not shown, for attaching the end of the film strip to the core so that the film is moved past lens 24 and wound onto the core as the latter is rotated. The film winding mechanism includes a driving member 34 rotatably supported in the lower end of the winding core and in hole 35 in lower wall member 36, beyond which the driving member is attached to an operating lever 37. A rectangular stud 38 extends upwardly from member 34 and is received in a mating hole 39 in the head portion 41 of clutch member 42. The clutch member is rotatably and slidably supported in the tubular core by its cylindrical head portion and by shaft 43 extending upwardly therefrom through partition 44. A ratchet disk 45 is attached to the upper end of shaft 43 and is urged downwardly with the clutch member by a light coil spring 46, to maintain its lower tooth surface 47 in unidirectional driving engagement with mating ratchet teeth 48 at the top of the core. Below the winding core, the driving member is provided with a cam 49, supporting a depending pin 51, which is resiliently biased against stop pin 52 on lower wall member 36 by means of a spring 53 surrounding the driving member and exerting a clockwise force thereon, as viewed from above. Adjacent its lower end, the winding core is encircled by a resilient spring clip 54 attached to a wall member 27 to impart frictional resistance to rotation of the core.

Figure 3:
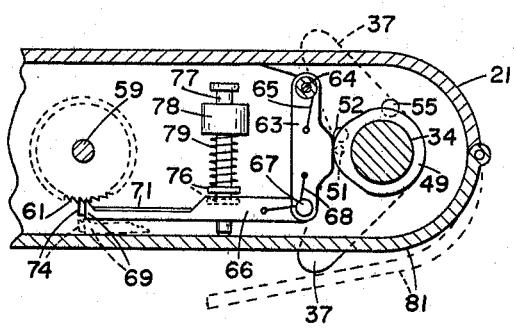
FIG. 3 is a partial cross-sectional top plan view taken along line 3—3 of FIG. 2.

To advance the film, the operating lever is moved, in a counterclockwise direction, as viewed in FIG. 3, against the influence of spring 53 and clip 54, to the position shown in broken lines, at which further movement of the lever is blocked by the engagement of pin 51 with a second pin 55 extending upwardly from the lower wall member. During such movement of the lever the winding core is rotated therewith by the ratchet disk, in driving engagement with teeth 48 on the core and rotatively connected to the lever by clutch member 42 and driving member 34, whereby sufficient film is wound onto the core to move an unexposed film area into alignment with lens 24. When the lever is released, it is rotated in a clockwise direction, as viewed in FIG. 3, to its former position by spring 53, along with the driving member, the clutch member and the ratchet disk. However, due to the frictional influence of clip 54 on the winding core, the core remains stationary as the ratchet disk rotates relative thereto by overcoming the slight downward force of spring 46, which maintains the ratchet teeth in contact. Accordingly, each time the lever is rotated as far as possible in a counterclockwise direction, as viewed in FIG. 3, and then released, the film is advanced to allow another exposure to be made. When all of the available exposures have been made, the clutch member can be raised manually to disengage the ratchet teeth by depressing the external end portion 56 of release rod 57 extending through the driving member, whereupon the film can be rewound into the magazine by rotating knob 32 with sufficient torque to overcome the relatively light frictional influence of clip 54 on the winding core.

The exposure counter mechanism comprises a rotatable dial member 58 attached to the top end of shaft 59, which extends through film guide member 22. At its lower end the shaft is provided with a ratchet wheel 61, the hub 62 of which extends through the lower wall member 36. A cam follower arm 63 is pivotally attached to wall member 27 by pin 64 and is resiliently urged against cam 49 by a light spring 65. At its opposite end the follower arm supports a driving pawl arm 66, attached thereto by a pin 67 and biased by a hairpin spring 68 to maintain the tooth end 69 of the pawl arm in contact with the ratchet wheel. A blocking pawl arm 71 is supported below the driving pawl arm by a pivot pin 72 extending into a boss on the lower wall member, and is biased by a spring 73 to maintain its tooth end 74 also in contact with the ratchet wheel. Accordingly, each time the operating lever is moved to advance the film, the ratchet wheel is rotated in a clockwise direction, as viewed in FIG. 3, through an angle corresponding to one tooth on the wheel, against the counterclockwise influence of spring 75 attached at its opposite ends to the dial member and to wall member 31. A rectangular washer 76 is attached to a pin 77 slidably supported in guide block 78 and is urged toward the adjacent pawl arms by a spring 79. When the camera cover door 81 is closed, it engages the end of the pin and maintains the pin in the position shown in FIG. 3, in which the washer is out of contact with the pawl arms. However, when the door is opened, as shown in broken lines in FIG. 3, the washer moves with pin 77 to displace the pawl arms out of engagement with the ratchet wheel, as also shown in broken lines in FIG. 3, so that spring 75 can return the dial member to its initial position defined by the engagement of pin 82 with pin 83.

Figure 4:
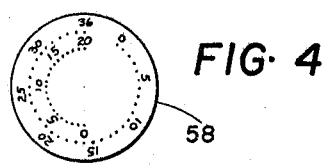
FIG. 4 is a top plan view of the exposure counter dial of the camera shown in FIG. 2.
Figure 2:
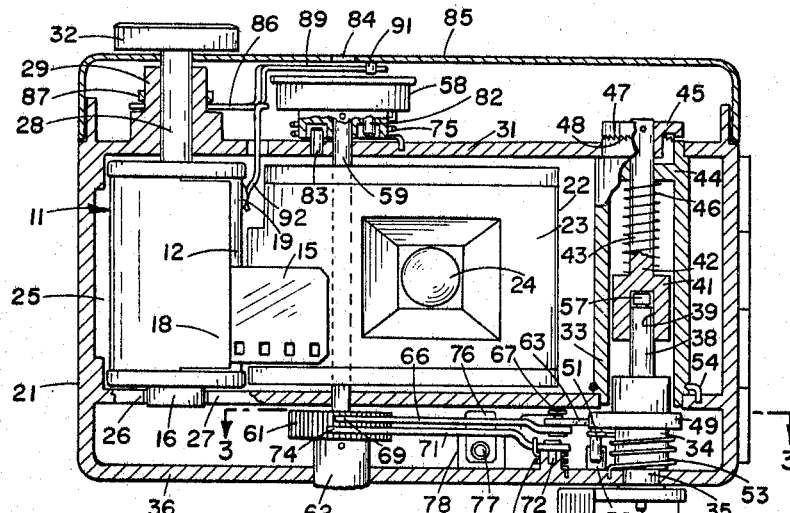
FIG. 2 is a rear elevational view of a camera adapted to accommodate a film magazine coded as shown in FIG. 1, with the camera back removed and portions of the camera structure shown cross-sectioned or broken away to illustrate details of various internal components.
Figure 5:
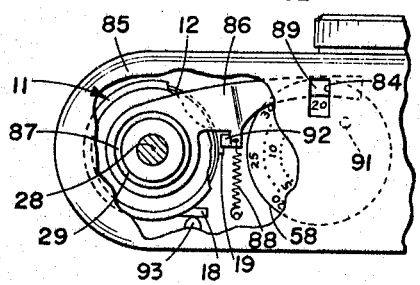
FIG. 5 is a partial top plan view of the camera shown in FIG. 2 with the rewinding knob removed and with portions of the camera and magazine omitted or shown broken away to illustrate the counter adjusting mechanism when a 20-exposure magazine is loaded into the camera.

On its top surface, the dial member is provided with indicia as shown in FIG. 4, comprising two concentric rows of exposure numbers and intermediate unit indicating marks spaced by uniform angular increments and decreasing numerically in a counterclockwise direction. By providing the ratchet wheel with uniformly spaced teeth corresponding in angular relation to the exposure numbers and unit marks on the dial, successive film advancing movements of the operating lever will cause corresponding successively lower numbers or marks on the dial to move into alignment with window 84 in cover member 85. When the camera is loaded, the dial will be positioned initially with the radially aligned numbers 20 and 36 displaced slightly in a counterclockwise direction from the window so that no numbering indicia will be visible until the lever is operated enough times to bring the first exposure area into alignment with the lens, whereby those two numbers will be moved into alignment with the window. Thereafter, each operation of the lever will advance a new exposure area into position and will rotate the dial in a clockwise direction by one unit, so that the outer number or mark aligned with the window will correspond to the number of exposures remaining if the camera is loaded with a 36-exposure magazine while the inner mark or unit so positioned will correspond to the remaining number of exposures provided by a 20-exposure magazine.

Figure 6:
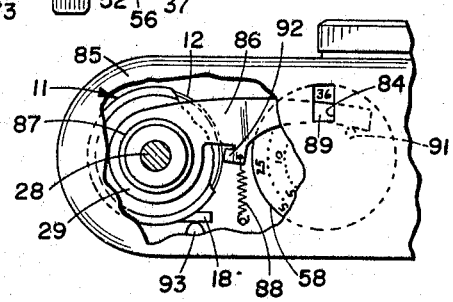
FIG. 6 corresponds to FIG. 5 and shows the positions of the depicted components when a 36-exposure magazine is loaded into the camera.

An adjustable lever 86 is pivotally retained on bushing 29 by a collar 87 and is biased in a clockwise direction, as viewed from above, by a light spring 88 toward the position shown in FIG. 6, in which the shutter arm portion 89 of the lever contacts pin 91 and obscures the rearward half of window 84. A code sensing finger 92 extends downwardly from lever 86 into compartment 25. When a 20-exposure magazine is installed in the magazine compartment, the lower end of the sensing finger engages the magazine casing and is displaced by the coding projection 19 to the position illustrated in FIG. 5 as the magazine is oriented, as shown, by the engagement of a boss 93 on the cover door with the tangential lip 18 of the magazine. Accordingly, the shutter arm of the sensing member is moved to obscure the forward half of the window, whereby the dial indicia corresponding to 20 available exposures will be visible to the operator. However, if the camera is loaded with a magazine that does not include a coding projection, the lever will remain in the position shown in FIG. 6 so that the dial indicia corresponding to 36 available exposures will be visible. If all of the 20-exposure magazines used in the camera are coded as described, the exposure counter will, of course, always be adjusted correctly for such magazines. However, if a conventional uncoded 20-exposure magazine is used, the mechanism will respond in the same manner as if the magazine contained 36 exposures. Therefore, if he wishes to use an uncoded 20-exposure magazine, the photographer can adjust the counter manually by rotating the dial in a clockwise direction to an appropriate initial position by means of the knurled end of hub 62, accessible at the bottom of the camera.

From the foregoing description, it will be recognized that this relatively simple coding system and camera construction ensures that the exposure counter mechanism indicates meaningfully the number of remaining exposures available when the camera is loaded with a magazine providing either of two predetermined numbers of exposures, while also allowing manual adjustment of the mechanism if uncoded magazines are used in the camera.

The film magazine and camera shown in FIGS. 7 through 12 to illustrate an alternate embodiment of the invention are generally similar to those previously described, with corresponding elements being identified by the same reference numerals distinguished by the suffix *a*. In this embodiment however, the coding projection may be located not just at one predetermined position but rather at any of several positions in different angular relation to lip 18a, according to the length of the film strip in the magazine. For example, the coding projection 19a shown in solid lines in FIGS. 7 and 8 represents a coded indication that the magazine is loaded with a 20-exposure film strip, whereas the projection would be located at the position shown in broken lines nearer the lip if 36 exposures were available, or at the other position shown in broken lines, farther from the lip, if only 10 exposures could be made on the film strip. It should be understood, of course, that these positions of the coding projection are only illustrative of the manner in which the location of the coding means can indicate the number of available exposures over a relatively broad range of different lengths of film that might be provided in such a magazine. Thus, while the illustrated positions of the projection distinguish between substantially different lengths of film, a slight variation in the position of the projection could similarly distinguish between film lengths varying by only one or two available exposure frames.

In the camera, shown in FIGS. 9–12, which is adapted to receive a magazine coded as shown in FIGS. 7 and 8, the exposure counter mechanism includes a dial member 58a which is rotated incrementally and reset by the same type of mechanism previously described. However, the dial member is provided with only one row of exposure counting indicia, corresponding to the outer row shown in FIG. 4. When the dial member has been reset to its initial position, the largest reference numeral, namely numeral 36, is located slightly beyond the reference mark adjacent window 84a in a counterclockwise direction as viewed from the top of the camera. As was previously mentioned, the exposure counter can be adjusted manually in a clockwise direction by means of hub 62a, due to the fact that the pawl arms preclude rotation of the ratchet wheel only in a counterclockwise direction. In the present embodiment of the invention, the counter device is adjusted automatically in a similar manner in response to the magazine coding means. This is accomplished by providing the end of lever 86a with a gear segment 94, meshed with a pinion 95 on dial adjusting member 96, which is supported in coaxial relation to the dial member by a stud 97 and includes an arm 98 bent downwardly at its outer end to engage the adjacent side of ear 99 extending outwardly from the rim 101 of the dial member. Accordingly, as a magazine is installed and oriented in the magazine compartment, sensing finger 92a is engaged by the coding projection and positions the lever accordingly, thereby rotating the dial to a corresponding position. By way of illustration, FIGS. 10, 11 and 12 show, respectively, the initial adjustment of the dial in response to magazines coded for 20, 10 and 36 exposures, with allowance being made in each case for two initial movements of the operating lever to bring the first usable exposure area into alignment with the lens. Since the downwardly bent end portion of arm 98 simply abuts against the adjacent side of ear 99 to adjust the dial member, the subsequent rotation of the dial member merely moves the ear out of contact with the end of the arm, which has no subsequent influence thereon. If an uncoded magazine is installed in the camera, arm 98 will be positioned as shown in FIG. 12, thereby allowing the dial member to be adjusted manually by means of hub 62a, as described above.

Figure 16:
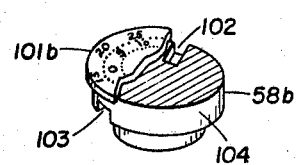
FIG. 16 is a perspective view of the rotatable dial member incorporated in the camera shown in FIGS. 13, 14 and 15.
Figure 17:
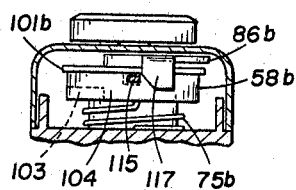
FIG. 17 is a cross-sectional view taken along the line 17—17 of FIG. 13, showing the means by which the disabling mechanism is adjusted in accordance with a 20-exposure film magazine.

The camera comprising the invention illustrated by FIGS. 13 through 19 embodies an exposure counter which is operated by the same mechanism shown in FIGS. 2 through 6 in response to magazine coding means of the type described in connection with FIG. 1, with corresponding parts being denoted by the same reference numerals followed by the suffix b. In this embodiment, dial member 58b may be identical to the corresponding member shown in FIGS. 2 through 6 except for the provision of radial openings 102 and 103 extending radially inwardly from cylindrical surface 104 below rim 101b, as best shown in FIG. 16. As will be explained later, it should be noted that, in addition to being displaced angularly from one another, the two radial openings are also at different positions along the axis of the dial member, opening 102 being immediately below rim 101b whereas opening 103 is adjacent the lower edge of surface 104.

Attached to the top of ratchet disk 45b, a pin 105 extends upwardly through a slot 106 in slide member 107, the elevated adjacent end 108 of which is supported by a slide block 109. A second vertical pin 111 extends vertically from link member 112 through a slot 113 in upper wall member 31b and is similarly received in a second slot 114 in the slide member. Accordingly, the slide member is movable along its longitudinal axis so that its tongue 115 can enter one of the openings 102 or 103 in the dial member when such an opening is aligned therewith. A coil spring 116 is adapted to bias the slide member toward the dial member and also to exert an upward influence on tongue 115, urging the tongue toward rim 101b.

Figure 18:
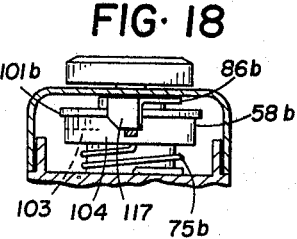
FIG. 18 is a cross-sectional view corresponding to FIG. 17 showing the illustrated components adjusted in accordance with a 36-exposure film magazine.
Figure 19:
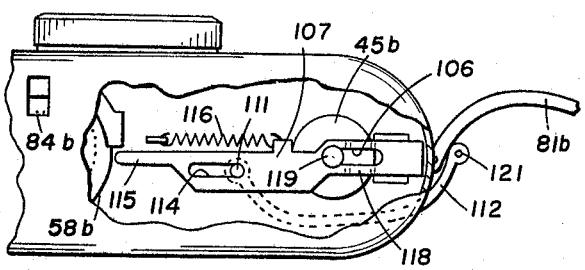
FIG. 19 is a partial top plan view corresponding generally to FIG. 13, showing the manner in which the disabling mechanism is reset when the camera door is opened.

The angular relation of opening 102 to the indicia on the metering dial is such that that opening will be moved into the same vertical plane as tongue 115 when the zero numeral at the end of the inner, 20-exposure row of indicia is aligned with window 84b, with opening 103 being similarly oriented with respect to the zero numeral of the outer, 36-exposure row of indicia adjacent the periphery of the dial. The adjustable lever 86b serves to obscure a portion of window 84b, as related previously, and also supports at its free end a depending cam ear 117, adapted to engage and depress tongue 115 to a position horizontally aligned with opening 103 when the arm is positioned in accordance with a 36-exposure film strip. When the dial member has been reset and before a film magazine has been installed, the lever arm is located in its 36-exposure position with neither of the two openings in the dial member being aligned angularly with the tongue member. Accordingly, the end of tongue 115 is resiliently urged against cylindrical surface 104 and is depressed by the lower surface of ear 117, into horizontal alignment with opening 103, as shown in FIG. 18. As long as the tongue remains engaged with surface 104, the slide member continues to assume the position in FIGS. 13 and 14 and does not influence the operation of the film advancing and exposure counter mechanisms.

Figure 13:
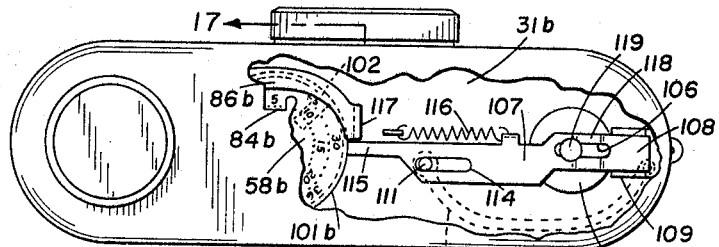
FIG. 13 is a top plan view of a camera similar to the one shown in FIG. 2, with a portion of the camera cover broken away to illustrate the structure employed in cooperation with the film counter mechanism for disabling the film winding mechanism after the last available film exposure area has been positioned for exposure.
Figure 14:
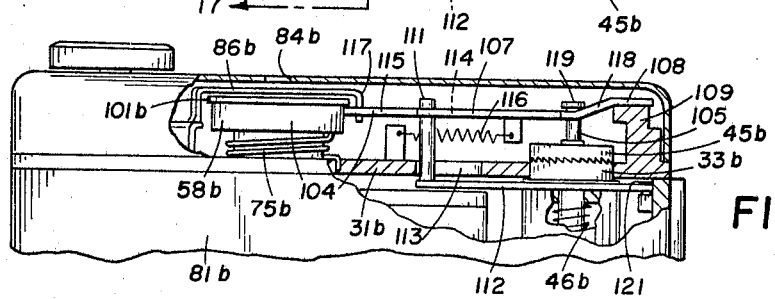
FIG. 14 is a partial rear elevational view of the camera shown in FIG. 13, broken away to shown the components of the disabling device in the positions which they assume so long as unexposed film areas are available for exposure.
Figure 15:
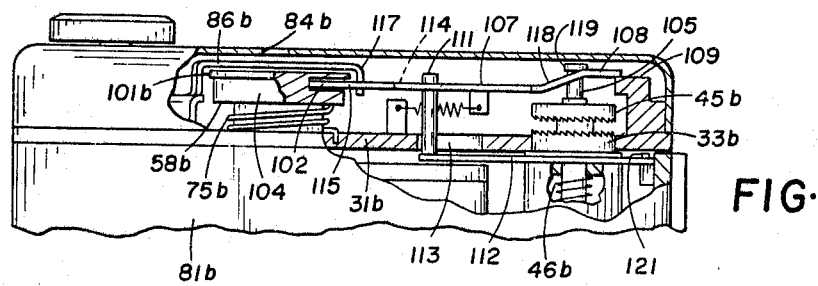
FIG. 15 corresponds to FIG. 14 and shows the disabling mechanism positioned to disable the film winding mechanism when the available exposure portion of the film has been exhausted.

When a coded magazine is loaded into the camera, the positions of lever 86b and tongue 115 remain unchanged if the magazine contains 36 exposures. If only 20 exposures are provided by the magazine, however, the lever is moved to the position shown in FIGS. 13, 14, 15 and 17, allowing the tongue to move upwardly into contact with rim 101b so that it is horizontally aligned with opening 102 at the opposite side of the dial member. In either case, as the advancement of the film causes the dial to rotate, the tongue remains engaged with cylindrical surface 104, as shown in FIGS. 13 and 14, until the opening in the same vertical plane as the tongue moves into direct alignment therewith, concurrently with movement of the corresponding zero numeral into view in the window. When this occurs, the slide is moved to the left by spring 116 as the tongue enters the aligned opening, whereby the slide is moved to the position shown in FIG. 15 or to a substantially similar but slightly tilted position in which the tongue is received by the lower opening 103. Such movement of the slide to either of these two similar positions causes the sloped upper surface 118 of the slide member adjacent slot 106 to engage the head 119 of pin 105 and to cam the pin upwardly against the influence of spring 46b to disengage the ratchet disk 45b from the winding core 33b. Thus, the film advancing mechanism is disabled automatically by the next operation of the operating lever after the last available exposure area has been moved into exposure position, to enable the film strip to be rewound into the magazine and to prevent possible damage to the film if the photographer should continue to operate the film winding lever. Alternatively, the disabling operation could accompany the movement of the last exposure area into exposure position, in which case, however, the mechanism would have to be calibrated more accurately to ensure that the advancing mechanism could not be disabled before the last exposure area had been positioned correctly. Although the previously described release rod 56 normally will not be required in this embodiment, it can nevertheless be retained, if desired, to enable the winding mechanism to be disabled manually if the photographer wishes to rewind the film before all of the available exposures have been made.

When the cover door 81b is opened to remove the film magazine, the pawl mechanism is disengaged, as explained before, to allow the dial member to be returned to its initial position by spring 75b. Before the dial can be reset, though, it is necessary to return the slide member to its former position in which tongue 115 is withdrawn from the opening in which it is received. This is accomplished by means of link member 112, which supports pin 111 and is attached at its opposite end to the cover door by a pin 121 so that movement of the door to the open position shown in FIG. 19 moves pin 111 along slot 113 to withdraw the tongue from the opening in which it is received in the dial member. As soon as the tongue is so withdrawn, the dial member is rotated back to its initial position, whereupon the slide member again assumes its initial location shown in FIGS. 13 and 14 when the door is moved toward its closed position.

It should be understood that the mechanism shown in FIGS. 13 through 19 could be adapted readily to a camera embodying an exposure counter device as shown in FIGS. 9 through 12 by providing the corresponding dial member with an opening adapted to receive the slide tongue when the dial is in its zero position, in which case no vertical adjustment of the tongue would be necessary inasmuch as the dial member itself is adjusted in accordance with the magazine coding means.

Although the film magazine illustrated and described is of the particular type commonly associated with 35 mm. film, the invention obviously contemplates the application of the same general concepts to other types of film magazines or related film containers such as spools, cartridges and cassettes, and to still or cinematographic cameras for use therewith. Similarly, the invention is not limited to the particular type of coding and code sensing means shown and described, but could be practiced by means of any other appropriate system whereby the film container is coded in a manner detectable by a sensing device in a camera to effect an adjustment of the camera mechanism in accordance with the number of exposures provided by the film strip associated with that container. Additionally, the means disclosed for disabling the film advancing mechanism could also serve to actuate a film rewinding mechanism, for example, a mechanism of the type also disclosed in the above-identified pending application.

The invention has been described in detail with particular reference to preferred embodiments thereof, but it will be understood that variations and modifications can be effected within the spirit and scope of the invention as described hereinabove and as defined in the appended claims.

I claim:

1. In a combination including a film container provided with an elongate strip of film and a camera having means for moving said strip to consecutively advance successive exposure areas therealong to an exposure location, the improvement comprising:
    (a) means defining a coding structure on said film container representative of a predetermined number of exposure areas provided along said film strip,
    (b) an exposure counter device having indicia corresponding to said exposure areas of said strip, and
    (c) adjusting means cooperating with and responsive to said coding structure for adjusting said exposure counter device so that the indicia indicated thereby is related to the number of said exposure areas along said strip subsequently advanceable to said location.

2. The improvement defined by claim 1 in which said exposure counter device comprises a dial member rotatable through successive angular increments in response to exposure area advancing movement of said strip and provided with numerical indicia positionable sequentially at a reference location by such rotation.

3. The improvement defined by claim 2 in which said adjusting means adjusts said exposure counter device in response to said coding structure prior to such movement of said strip by rotating said dial member to an initial angular position related to the predetermined number of exposure areas provided along said strip as represented by said coding structure.

4. The improvement defined by claim 2 in which said dial member is provided with rows of numerical indicia, said adjusting means comprising means for selectively relating said reference location to the one of said rows corresponding to the predetermined number of exposure areas provided along said strip as represented by said coding structure.

5. In a camera loaded by insertion of film carrying means including structural means of a preselected conformation representative of the length of an elongate strip of film carried by said film carrying means, said camera comprising:
    (a) a film exposure system,
    (b) intermittently operatable means for advancing said strip to consecutively align adjacent image receiving increments of said strip with said system for exposure thereby to produce along said strip a plurality of exposed image areas limited in number according to the length of said strip, and
    (c) an exposure indicator device including:
        (1) indicia comprising a scale of consecutive numerical units,
        (2) reference means for denoting selectively an indicium comprising said scale, and
        (3) indicator actuating means for reducing by one unit the indicium denoted by said reference means in response to each operation of said intermittently operatable means,
    the improvement comprising:
    (d) adjustment means cooperating with and responsive to the conformation of said structural means for selectively adjusting said exposure indicator device so that the indicium denoted by said reference means when said strip is positioned for the production of the first exposed image area thereon corresponds to the number of exposed image areas that can be produced along said strip as determined by its length.

6. In a camera adapted to receive a film container provided with physically detectable coding means representative of the length of an elongate strip of film carried by said container and including means for advancing said film to produce therealong a series of exposed image areas limited in number in accordance with the length of said strip, the improvement comprising:
    (a) code sensing means for detecting said coding means on a film container received in said camera, and
    (b) indicator means adjustable by said code sensing means in accordance with the length of the strip of film carried by a film container so received in said camera for indicating at progressive stages of advancement of said strip the number of exposed image areas that can be produced subsequently along said strip.

7. A camera adapted to be loaded with a film container including means defining a coding surface disposed thereon in accordance with the length of an elongate strip of film carried by said container, said camera comprising:
    (a) means for exposing to light consecutive adjacent portions of a strip of film carried by a film container loaded into said camera to produce along said strip a plurality of exposed latent image areas limited in number according to the length of said strip, and
    (b) indicator means adjustable in response to the disposition of said coding surface on a film container loaded into said camera for indicating in accordance with the length of the film strip carried thereby the number of such latent image areas that subsequently can be so produced along said strip as successive portions of said strip are so exposed.

8. A camera adapted to be loaded with a film container having a tactile surface irregularity at a position characteristic of the length of an elongate strip of film carried by said container, said camera comprising:
    (a) a lens system,
    (b) film advancing means for advancing longitudinally a strip of film carried by a film container loaded into said camera to move consecutively into alignment with said lens system a plurality of adjacent exposure areas along said strip limited in number by the length of said strip,
    (c) indicator means adjustable in response to the position of said tactile surface irregularity on a film container loaded into said camera for visibly identifying the particular exposure area of the film strip carried by said container which is aligned with said lens system in accordance with a numerical reference system in which the exposure areas along such a strip of film are numbered consecutively from the numeral one associated with the last of such areas movable into alignment with said lens system by said film advancing means.

9. A camera comprising:
    (a) means for receiving a film container having a tactile surface irregularity at a position characteristic of a predetermined number of exposure areas along a strip of film carried by said film container, (b) means for exposing consecutive exposure areas along a film strip carried by a film container received by said camera, (c) an exposure counter device adjustable in accordance with predetermined numbers of exposure areas along a film strip carried by a film container received by said camera, and (d) means cooperating with said tactile surface irregularity of a film container received by said camera for adjusting said device in accordance with the predetermined number of exposure areas along said strip carried by said received container as characterized by the position of said irregularity.

10. A camera adapted to receive film carrying means including tactile coding means representative of a predetermined number of adjacent exposure areas along a strip of film carried by said film carrying means, said camera including:

(a) an optical system, (b) means for advancing said strip of film carried by said film carrying means received by said camera to consecutively position successive exposure areas therealong in alignment with said optical system for exposure of said areas, (c) a counter device for monitoring such advancement of said strip and visibly indicating the progress thereof by displaying consecutive numeral indicia in decreasing sequence in response to advancement of said strip to align successive exposure areas with said optical system, and (d) means for adjusting said counter device automatically in response to said coding means so that the numeral indicium displayed when the first of such exposure areas is aligned with said optical system corresponds to the number represented by said coding means.

11. A camera adapted to receive a film container provided with an elongate strip of film and with a coding structure representative of a predetermined number of adjacent exposure areas of predetermined length along said strip, said camera including:

(a) means for moving said strip to consecutively advance successive exposure areas therealong to an exposure location, (b) an exposure counter device adapted to indicate consecutively smaller serialized numbers in response to advancement of successive exposure areas of said strip to said location, (c) adjusting means cooperating with and responsive to said coding structure for adjusting said device so that a number indicated thereby is related to the difference between the number of exposure areas along said strip that have been advanced past said location and the number of exposure areas represented by said coding structure.

12. A camera comprising:

(a) means for receiving a film container carrying an elongate strip of film and provided with tactile coding means representative of a predetermined number of exposure areas along said strip, (b) film advancing means for advancing the film strip carried by a received container to position successive exposure areas of said strip at an exposure location, and (c) means adjustable automatically in response to said coding means on said received container for disabling said film advancing means automatically after said strip has been advanced to position at said location the number of successive exposure areas represented by said coding means.

13. A camera comprising:

(a) means for receiving a film container carrying an elongate strip of film and provided with tactile coding means representative of the length of strip carried by said container, (b) film advancing means for moving a portion of the film strip carried by a received container intermittently along a predetermined path past a predetermined exposure location, and (c) means adjustable automatically in response to said coding means on said received container for disabling said film advancing means automatically in response to movement past said location of a portion of said strip bearing a predetermined length relation to the length of said strip as represented by said coding means.

14. A camera adapted to receive a film container provided with an elongate strip of film and with a coding structure representative of a predetermined number of adjacent exposure areas of predetermined length along said strip, said camera comprising:

(a) film advancing means for moving said strip to consecutively advance successive exposure areas therealong to an exposure location, (b) an exposure counter device including a member movable to consecutive incremental positions in response to corresponding advancement of said strip, (c) adjusting means cooperating with and responsive to said coding structure for adjusting said device in accordance with the number of exposure areas represented by said coding structure, and (d) means for disabling said film advancing means automatically in response to movement of said member to a predetermined one of said incremental positions.

15. In a combination including a cartridge adapted to receive a strip of film having a predetermined number of exposure areas; and a camera having means for receiving said cartridge, means for advancing a strip of film received in said cartridge along a path past a predetermined location, and means for counting the number of said exposure areas being advanced past said location; the improvement comprising:

(a) tactile coding means on said cartridge, said coding means being representative of said number of adjacent exposure areas on said strip of film; and (b) means carried by said camera for presetting said counting means in response to said coding means to count only the number of exposure areas on said strip of film as represented by said coding means.

16. In a combination including a cartridge adapted to receive a strip of film having a predetermined number of exposure areas; and a camera having means for receiving said cartridge, the improvement comprising:

(a) tactile coding means on said cartridge, said coding means being representative of said number of adjacent exposure areas on said strip of film; and (b) means responsive to said coding means for indicating the number of exposure areas on said strip of film.

References Cited

UNITED STATES PATENTS

| | | | |
|---|---|---|---|
| 2,591,417 | 4/1952 | Frye | 95—31 |
| 2,838,984 | 6/1958 | Lareau et al. | 95—31 |
| 3,057,277 | 10/1962 | Swarofsky et al. | 95—31 |
| 3,266,397 | 8/1966 | Kremp et al. | 95—31 |
| 3,276,340 | 10/1966 | Nerwin | 95—31 |

NORTON ANSHER, Primary Examiner

DAVID S. STALLIARD, Assistant Examiner

U.S. Cl. X.R.

352—78